United States Patent
Malanov et al.

(10) Patent No.: US 12,530,454 B2
(45) Date of Patent: Jan. 20, 2026

(54) BEHAVIOR ANALYSIS BASED ON FINITE-STATE MACHINE FOR MALWARE DETECTION

(71) Applicant: Acronis International GmbH, Schaffhausen (CH)

(72) Inventors: Alexey Malanov, Singapore (SG); Serguei Beloussov, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 250 days.

(21) Appl. No.: 17/449,616

(22) Filed: Sep. 30, 2021

(65) Prior Publication Data
US 2023/0096108 A1     Mar. 30, 2023

(51) Int. Cl.
*G06F 21/00*     (2013.01)
*G06F 9/448*     (2018.01)
(Continued)

(52) U.S. Cl.
CPC .......... *G06F 21/566* (2013.01); *G06F 9/4498* (2018.02); *G06F 21/552* (2013.01);
(Continued)

(58) Field of Classification Search
CPC .... G06F 21/566; G06F 9/4498; G06F 21/552; G06F 21/577; G06F 21/56; G06F 2221/034; G06F 21/554; G06F 9/542
See application file for complete search history.

(56) References Cited

U.S. PATENT DOCUMENTS 5,537,580 A * 7/1996 Giomi ..................... G06F 30/30
716/55
5,966,516 A * 10/1999 De Palma ........... G06F 30/3323
703/1
(Continued)

FOREIGN PATENT DOCUMENTS

| CN | 101950271 A | 1/2011 |
| CN | 106534195 A | 3/2017 |

(Continued)

OTHER PUBLICATIONS

Y. Alosfer and O. Rana, "Automated State Machines Applied in Client Honeypots," 2020, IEEE, 5th International Conference on Future Information Technology, pp. 1-8 (Year: 2010).*

*Primary Examiner* — Kevin Ayala
(74) *Attorney, Agent, or Firm* — ESPE Legal Consultancy FZ-LLC

(57) ABSTRACT

A system and method are disclosed for identifying malicious activity on a target device based on behavior analysis of the target device. The system includes a behavioral analyzer run on a virtual machine connected to the target device. The virtual machine collects system events and parameters from the target device and run a script, independent of the target device, to detect a threat. The script is a set of instructions executed to analyze behavior of an object by processing and correlating the events. The script includes a rule structure which stores signatures and expressions of the known malwares. By correlating the selected event parameters with known malware parameters, it is determined whether the event imposes a threat or not. A finite state machine is used for the state transition table.

20 Claims, 4 Drawing Sheets

(51) Int. Cl.
   *G06F 21/55* (2013.01)
   *G06F 21/56* (2013.01)
   *G06F 21/57* (2013.01)

(52) U.S. Cl.
   CPC .......... *G06F 21/554* (2013.01); *G06F 21/577* (2013.01); *G06F 2221/034* (2013.01)

(56) References Cited

U.S. PATENT DOCUMENTS

| | | | |
|---|---|---|---|
| 6,487,666 B1* | 11/2002 | Shanklin | G06F 21/55 709/224 |
| 8,370,931 B1* | 2/2013 | Chien | G06F 21/566 709/224 |
| 9,262,635 B2 | 2/2016 | Paithane et al. | |
| 9,324,034 B2 | 4/2016 | Gupta et al. | |
| 9,684,870 B2* | 6/2017 | Fawaz | G06N 5/025 |
| 9,710,752 B2 | 7/2017 | Salajegheh et al. | |
| 9,774,613 B2 | 9/2017 | Thomas et al. | |
| 10,977,165 B2* | 4/2021 | Agrawal | G06F 9/4498 |
| 11,250,126 B2 | 2/2022 | Strogov et al. | |
| 11,431,676 B2* | 8/2022 | Gan | G06F 21/552 |
| 11,556,640 B1* | 1/2023 | Tully | G06N 5/01 |
| 2013/0312099 A1 | 11/2013 | Edwards et al. | |
| 2014/0283024 A1* | 9/2014 | Gathala | H04W 12/122 726/22 |
| 2015/0220735 A1* | 8/2015 | Paithane | G06F 9/45558 726/23 |
| 2016/0042179 A1* | 2/2016 | Weingarten | G06F 21/56 726/23 |
| 2021/0266339 A1* | 8/2021 | Moshitzky | H04L 63/1441 |
| 2021/0406109 A1 | 12/2021 | Kulaga et al. | |
| 2022/0085815 A1* | 3/2022 | Lo | H03K 19/17728 |

FOREIGN PATENT DOCUMENTS

| | | | | |
|---|---|---|---|---|
| CN | 106534195 B | | 10/2019 | |
| CN | 112784268 A | | 5/2021 | |
| CN | 109582398 B | * | 2/2022 | .......... G06F 9/4498 |
| EP | 2669797 A2 | * | 12/2013 | .............. G06F 8/41 |
| JP | 4864432 B2 | * | 2/2012 | |

* cited by examiner

BEHAVIOR ANALYSIS BASED ON FINITE-STATE MACHINE FOR MALWARE DETECTION

FIELD OF THE INVENTION

The present disclosure generally relates to data security management, and particularly, but not limitedly, to a system and method for identifying malicious activity on a target device via behavior analysis thereof.

BACKGROUND

With stupendous advancements in digital technology, data security has become a key concern. Constantly updating malware forms is a pervasive problem that results in successful malware attacks, changing threat definitions, compromise critical data, and so on. Data security is normally defended using various malware detection units; usually classified as malware detection programmable components and security components. Data analysis can be performed by the malware detection programmable component at various levels of the computing system, such as user space, kernel space, and emulator. The analysis can be performed on individual processes, specific applications, system functions, and the entire operating system. Files, threads, and registry operations are supported as types of analysis. If the malware attack is detected, the security components can perform corrective actions to block any communication with the malware.

Conventionally, the general approach of behavior analysis includes the steps of hooking and collecting system events, after which the system event parameters are analyzed for detecting any patterns that are characteristic to malicious activity. A disadvantageous aspect of the conventional analyzers is high computing resource consumption as well as the low speed of performing the analysis. One reason for such disadvantageous aspects is that for performing the analysis, the conventional analyzer is required to perform a stack of operations per user, per process, per application, and then match it with a known behavior signature. Another disadvantageous aspect of the conventional analyzers is that in course of system monitoring the conventional behavior analyzer itself has no features for predicting a threat or tracking a risk of threat. Yet another disadvantageous aspect of the conventional analyzers is the inflexibility of the behavior analyzers to update signatures, detection rules, and event processing rules, wherein receiving updates is in the form of libraries or compiled code and has limitations in terms of applicability, errors handling, differential updates, etc.

Therefore, there is a need for a system and method for identifying malicious activity on a target device that overcomes the aforementioned disadvantageous aspects of the prior art.

SUMMARY

Embodiments and technical aspects disclosed herein relate to a system and method for identifying malicious activity on a target device via behavior analysis.

The present disclosure envisages a method for identifying malicious activity on a target device based on behavior analysis of the target device. The target device is connected to a virtual machine on which a behavioral analyzer is implemented. The behavioral analyzer is a set of script instructions executed for analyzing behavior of an object or target device events. The virtual machine interprets the behavior analyzer script instructions and operates with behavior analyzer objects. The method comprises retrieving system events of the target device at the virtual machine; filtering the system events by applying filters to event parameters associated with the events of the target device for identifying at least one event of interest; changing a state of a finite-state machine to an expected state in accordance with the finite-state transition table; and executing instructions defined for the expected state at a threat handler determining an instance of malicious activity on the target device.

In a non-limiting alternative embodiment, a behavior analyzer repository is connected to the behavior analyzer that includes information associated with expected finite states corresponding to a plurality of events.

In a non-limiting alternative embodiment, the at least one event of interest is an event that exposes the target device to a chance of a malware attack or malicious activity.

In a non-limiting alternative embodiment, the one or more event parameters include registry key, access permission, and network session parameters.

The present disclosure also envisages a system for identifying malicious activity on a target device based on behavior analysis of the target device. The system comprises a virtual machine connected to the target device for retrieving system events of the target device, the virtual machine runs a behavior analysis module. The behavior analysis module includes an event processing module configured for filtering the event parameters associated with the events of the target device for identifying at least one event of interest; an event correlator module configured for changing a state of the finite state machine to an expected state in accordance with the finite state machine; and a threat handler module configured for identifying an instance of malicious activity on the target device.

In a non-limiting alternative embodiment, the system further comprising a behavior analyzer repository connected to the behavior analyzer, wherein the behavior analyzer repository includes information associated with expected finite states corresponding to a plurality of events.

In a non-limiting alternative embodiment, the at least one event of interest is an event that exposes the target device to a chance of a malware attack or malicious activity.

In a non-limiting alternative embodiment, the one or more event parameters include registry key, access permission, and network session parameters.

BRIEF DESCRIPTION OF DRAWINGS

A better understanding of embodiments of the present disclosure, including alternatives or variations thereof, may be obtained with reference to the detailed description of the embodiments along with the following drawings, in which.

DETAILED DESCRIPTION

The embodiments will now be described more fully hereinafter with reference to the accompanying figures, in which preferred embodiments are shown. The foregoing may, however, also be embodied in alternative configurations that are consistent with this disclosure.

Figure 1:
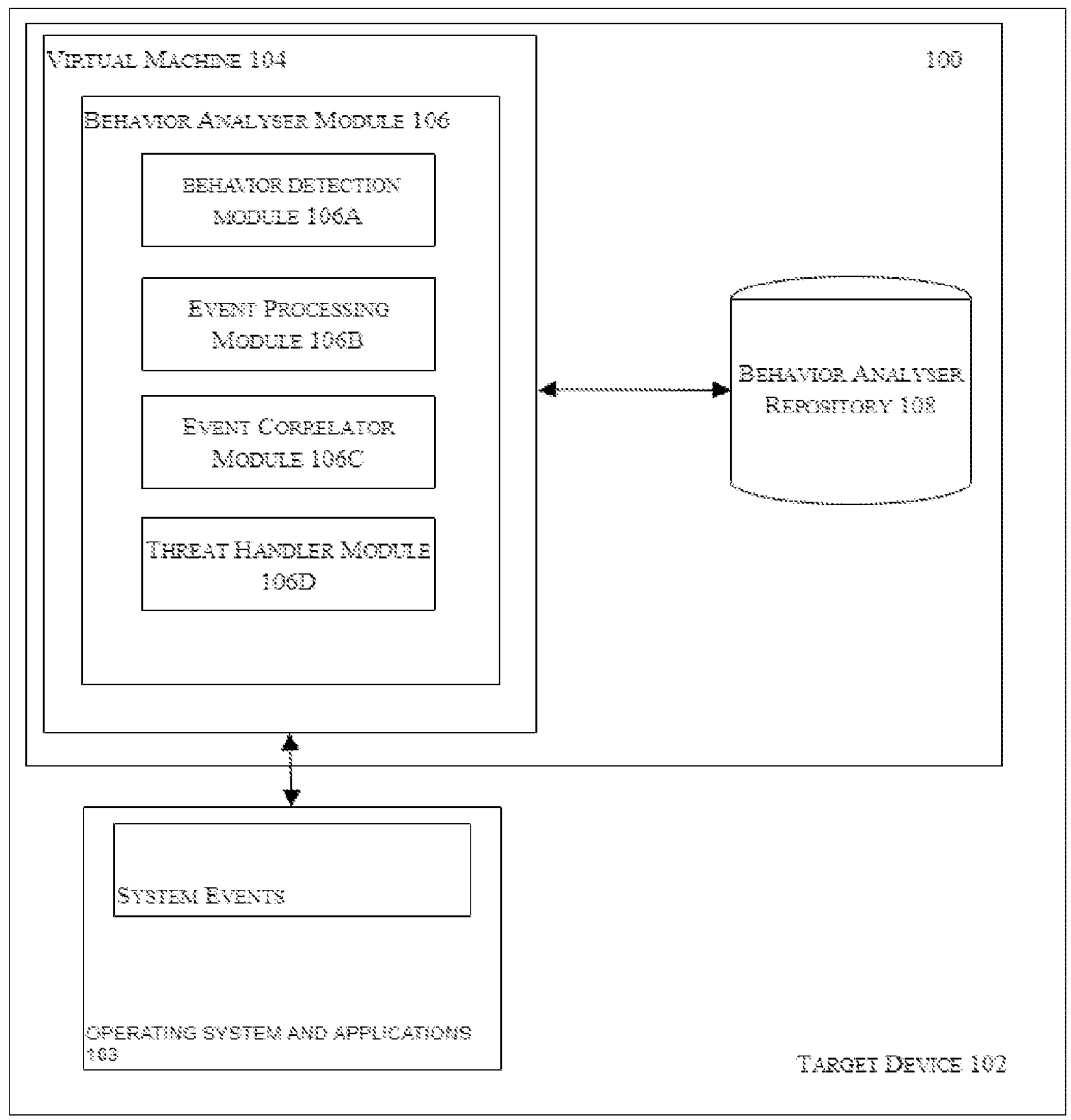
FIG. 1 illustrates a block diagram depicting a system for a system for identifying malicious activity on a target device based on behavior analysis of the target device, in accordance with an embodiment of the present disclosure.

FIG. 1 illustrates a block diagram depicting a system 100, hereinafter referred to as system 100, for identifying malicious activity on a target device based on behavior analysis of the target device 102, in accordance with an embodiment of the present disclosure. The system 100 implemented on the target device 102 for identifying a malicious activity in operating system and applications 103 running on the target device 102. The system mainly includes a virtual machine 104 with a behavioral analyzer implemented on the target device 102. The examples of the target device 102 may include at least one or more laptops, desktops, servers, gateways, communication ports, handheld or mobile devices, firewalls, and the like.

In one implementation, the virtual machine 104 may be configured on the target device 102. The virtual machine is a computing resource that uses its own software instead of a physical computing machine to run programs and functions. For example, the virtual machine runs its own operating system. Multiple virtual machines can be run on one computing system, where each virtual machine utilizes its own operating system and runs separately from other virtual machines running on the same computing machine. Virtual machines can be used for server virtualization allowing the user to consolidate his/her computing resources and improving efficiency. Further, the virtual machines can perform specific tasks which are considered as a threat to run in a host target device. Examples of such tasks may include accessing virus infected data, testing operating systems, running unknown and unidentified functions and the like. As the virtual machine is separated from the rest of the host target device, it can perform the functions without imposing any threat to the host target system. Any malfunction occurred in the virtual machine cannot affect the performance of the host target device. These advantageous technical aspects of the virtual machines render the present subject matter more efficient, robust and most secured compared to present known arts in the field. Another advantage of the usage of virtual machines for processing behavior analysis is the compatibility of event processing operations, threat handling operations and other operations of behavior analyzer with applications, system services and hardware of the target device.

The virtual machine referred to in FIG. 1 runs on the target device 102. Operating system and system components of the target device can be accessed by the virtual machine. The virtual machine can be connected to the target device via transport methods for data transport and communication. Examples of the transport methods may prominently include network socket, Inter-Process communication (IPC), and shared memory. A network socket is a structure within a network node of a computer network that serves as an endpoint for sending and receiving data across the network. Sockets are created only during the lifetime of a process of an application running in the node. IPC involves communication of one process with another process. IPC can serve between related processes initiating from only one process, such as parent and child processes, and between unrelated processes, or two or more different processes. Further examples of the transport methods may include Storage Area Network (SAN) supported for directly connected storage using Fibre Channel (FC) or Internet SCSI (iSCSI) protocols, HotAdd which is a virtual server agent installed on a virtual machine residing on an ESX server, Local Area Network (NBD and NBDSSL) which transmits data over the TCP/IP connection between the ESX server and the target device/proxy computer, Network Attached Storage (NAS) which enables the virtual server agent (VSA) proxy computer to read data directly from the network file server (NFS), without going through an ESX host or transferring data over the LAN, and the like. The virtual machine thus can access related or unrelated processes being processed on the operating system of the target device, including system logs and hooks. In another implementation, the virtual machine can be connected to the target device via a remote server.

In accordance with the embodiment of the present subject matter, the target device 102 includes an operating system and other applications. The target device 102 may be any smart device or a computing system that includes one or more processors and one or more memories. The operating system has one or more operating system components. Access to the system components is shared with the virtual machine to process event parameters of all the events occurring on the target device 102. In accordance with one possible exemplary embodiment, a remote direct memory access of the target device 102 may be provided to the virtual machine 104 for ensuring that the virtual machine 104 has access to the random-access memory (RAM) of the target device 102 for retrieving, non-invasively, the system event parameters therefrom.

The target devices 102 are computing devices having a processor, such as laptops, desktops, servers, gateways, communication ports, or mobile devices. The network may be distributed amongst a plurality of computing devices and a plurality of geographical locations. The malware threat may come from network threats, physical proximity threats, secondary location threats, and the like. The target device 102 picks up the threat when interfacing with an unprotected server through the Internet.

The virtual machine 104, in accordance with an embodiment of the present disclosure, is configured to run a behavior analyzer 106. The behavior analyzer, in one implementation without limitation, is a tool constructed using high-level programming instructions to detect and stop processes exhibiting the malicious and suspicious behavior pertaining to kernel-level events as well as events coming from the operating system. The behavior analyzer is configured to analyze an object's behavior, and in some cases, its intended or potential behavior for detecting suspicious activities. The behavior analysis-based malware detection evaluates a target device object based on its intended actions before it can actually execute that behavior. For example, attempts to perform actions that are unauthorized for a particular user, actions that are abnormal to carry out on that particular target device, and the like indicate that the behavior of the object or the activity is potentially malicious. Further examples of intended behavior that can be considered as malicious or suspicious may include attempts to discover a sandbox environment, disabling security controls, installing rootkits, registering for autostart and such. Evaluating such malicious behavior is regarded as dynamic analysis.

As mentioned earlier, the behavior analyzer is a tool constructed using high-level programming languages.

Executable instructions coded in the high-level programming languages are referred to as Scripts or Bytecodes. To execute the script, the virtual machine serves as an interpreter. The high-level languages use interpreters instead of compilers. The objective here is to create an intermediate code that can understand the language and execute it without having to translate the program into machine code. Therefore, the virtual machine herein acts as an intermediate code that can understand and execute the instruction set for behavior analysis coded into a high-level language and execute the instructions without having the script compiled by the processor of the target device. The instruction set is the script which is referred to as the behavior analyzer throughout the present description.

The behavior analyzer is constructed using a high-level programming language. For example, in one implementation, Lua scripting is used to build the set of instructions. Lua is a lightweight, high-level, multi-paradigm programming language. Lua is a cross-platform language as the interpreter if compiled bytecode is written in ANSI C.

The behavior analyzer includes a behavior detection module 106A which initializes the behavior detection. The behavior detection is based on a rule structure. The rule structure is executed by the virtual machine. The rule structure is basically a data structuring mechanism that represents different types of arrays and dictionaries. Each rule is a table with arrays which can be indexed with not only numbers but also with strings. As a standard global rule, the rules inside virtual machines contain tables with data structures associated with different events to be detected. In one implementation of the embodiment, the rules contain a set of tables with data structures associated with malicious events to be detected. For example, RuleEmotet. The Emotet is a banking trojan that attempts to sneak onto your computer and steal sensitive and private information. As the Emotet malware is known, signatures and instructions associated with the same are stored in the table RuleEmotet. Likewise, a set of tables is created in Lua to identify such malicious events.

The rule is prominently divided into two stages, first a signature-automata and second, a logical block. The behavior analyzer extracts signatures associated with the events. The signature is a typical footprint or pattern associated with a malicious attack on a computer network or system. This pattern can be a series of bytes in the file (byte sequence) in network traffic. It can also take the form of unauthorized software execution, unauthorized network access, unauthorized directory access, or anomalies in the use of network privileges.

The behavior analyzer further extracts expressions, which are logical combinations of signatures, and combines the expressions into one logical block. Logical expressions could be a set of Boolean operators identifying the signature event. The signature event may be a packet type, a sequence of packet types, or any one of a number of signature related events, such as a count or a time period. Logical operators are used to describe relationships between the signature events, such as whether a count exceeds a certain value. For each signature, one or more of these identifiers and operators are combined to provide a regular expression describing that signature.

The behavior analyzer further extracts handlers which are functions related to the signature and store the handlers into the logical block. Specifically, it is a function with two arguments, context and event and both arguments are tables. Context is initially empty, and some elements are coupled from an event on CtxCreate event. An event contains key-value pairs of currently processed events. A handler is called when a corresponding expression becomes true. Examples of handlers include Print(a, b, c . . . ). The print function is called to print something to console, which is particularly useful during rule debugging. Few other examples include trace(level, message), get_context(puid), on_event(context) and the like.

The behavior detection module 106A thus initializes the rule structure to process signatures, logical expressions and handlers related to the event. The event is processed by an event processing module 106B configured for filtering the event parameters associated with the events of the target device 102 for identifying at least one event of interest. In accordance with one embodiment, the at least one event of interest is an event that exposes the target device to a chance of a malware attack and/or malicious and suspicious activity. Some examples of events of interest include, but not limited to, interfacing with an unprotected server through the Internet or connecting a USB flash memory stick to the target device, and the like. In a non-limiting alternative embodiment, the one or more event parameters include registry key, access permission, and network session parameters and the like.

The behavioral analyzer generates a context for the new process, in accordance with the implementation of the present embodiment. Special event CtxCreate is sent to this context with one or more properties furled. The examples of properties include cmdline, image_filename, pid, parent_pid, sid. The new events are furled into one string. In one example, the string is gen-line. Not all, but only specific properties with fixed order are furled into the string. One or more filters can be applied to select the specific event properties. The string is then checked against all the signatures from rules. Only selected properties are combined into the string, and they are separated by bytes with values x01, x02 for unambiguity.

The behavior analysis module 106 further comprises an event correlator module 106C, according to the implementation of the embodiment. The relevant expressions are evaluated for correlating the event. The event correlator module 106C uses a finite state machine for state transition from one state to another based on the state transition table. The finite state machine is a computation module that can be used to simulate sequential logic. Basically, it represents and controls execution flow. Based on the event sequence, event parameters, and characteristics of a suspicious or a malicious activity pertaining to the event being processed, the state of the finite state machine is changed by the event correlator module. The event correlator module is configured to change the state of the finite-state machine to an expected state corresponding to the events of interest in accordance with the finite-state transition table. Table A is an exemplary demonstration of event sequences and expression evaluation. Table A is static and global. As stated in the table, there are multiple events being considered, events a, b, and c. Corresponding expressions are stated in row 4-15 which includes 'and, or, then, except'. Each event herein has several triggers that are executed when this event occurs. For example, on the occurrence of event A, following actions are performed:
1. Handler1 is executed
2. if event 2(b) is already set, event 4 (a and B) occurs
3. event 6 (a and b) automatically occurs, then event 12 (a, b, or c) occurs. The handler7 is executed as a result
4. 'or' conditions are evaluated trivially 5. 'and' and 'then' conditions require triggers with two operands. Complex conditions are split into trivial. Context event vector is created per each monitored process, filled with zeroes.

TABLE A

| Events | Meaning | Triggers | | | | | | |
|---|---|---|---|---|---|---|---|---|
| 1 | a | EXECUTE Handler1 | IF 2 then SET 4 | SET 6 | | IF 2 then SET 9 | | EXCEPT 2 SET 13 |
| 2 | b | | IF 1 then SET 4 | SET 6 | | IF 1 then SET 8 | | |
| 3 | c | | IF 4 then SET 5 | SET 12 | If 6 then SET 7 | IF 9 then SET 10 | IF 6 then SET 11 | |
| 4 | a and b | | IF 3 then SET 5 | | | | | |
| 5 | 4 and c | EXECUTE Handler2 | | | | | | |
| 6 | a or b | | IF 3 then SET 7 | SET 12 | | | | |
| 7 | 6 and c | EXECUTE Handler3 once | | | | | | |
| 8 | a then b | EXECUTE Handler4 | | | | | | |
| 9 | b then a | | | | | | | |
| 10 | 9 then c | EXECUTE Handler5 | | | | | | |
| 11 | 6 then c | EXECUTE Handler6 | | | | | | |
| 12 | 6 or c | EXECUTE Handler7 once | | | | | | |
| 13 | a except b | | | | | | | EXCEPT 3 SET 14 |
| 14 | 13 except c | EXECUTE Handler8 | | | | | | |

The behavior analysis module 106 further comprises a threat handler module 106D configured for identifying behavioral threats. Based upon event correlation determined based upon the state generated by a finite state machine. For example, during event correlation, if the event matches an attempt to access an unauthorized datafile, the threat handler module can determine an instance of malicious activity on the target device. If the threat handler module 106D determines that an instance of malicious activity has occurred on the target device 102, the threat handler module 106D may further be configured to inform an anti-malware security solutions firmware on the target device 102 of the instance of malicious activity for further action.

The system 100 further comprises a behavior analyzer repository 108 is connected to behavior analyzer via virtual machine interpreter. The behavior analyzer repository 108 includes information associated with expected finite states corresponding to a plurality of events. In an embodiment, behavior analyzer repository 108 comprises one or more rules. Such rules are described in more detail in connection with FIG. 3 below.

Figure 2:
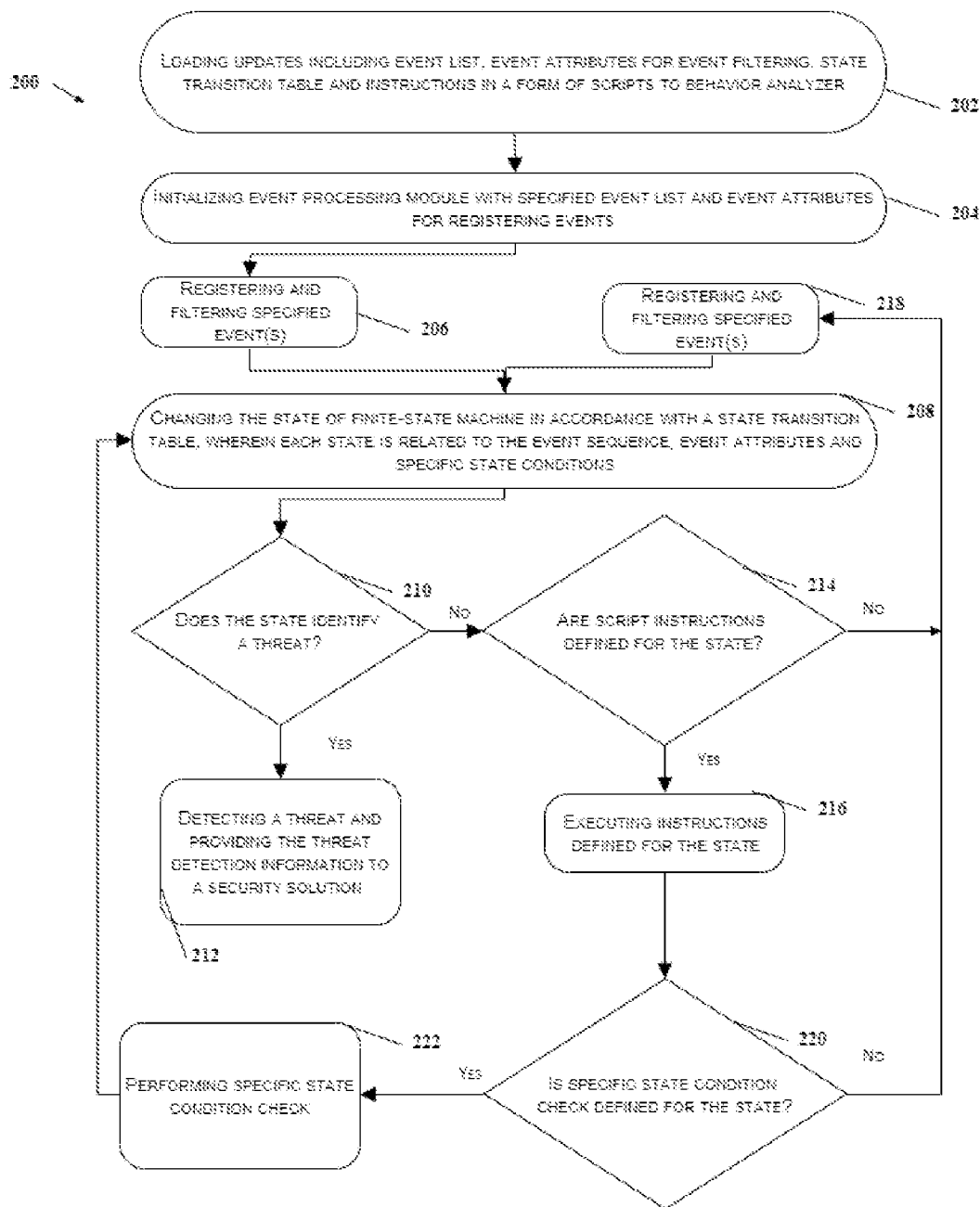
FIG. 2 illustrates a block diagram depicting a process for a system for identifying malicious activity on a target device based on behavior analysis of the target device, in accordance with an embodiment of the present disclosure.

FIG. 2 illustrates a block diagram depicting a process 200 for a system for identifying malicious activity on a target device based on behavior analysis of the target device, in accordance with an embodiment of the present disclosure. It is to be noted that the process 200, in accordance with one embodiment, may be executed by the system 100. At block 202, the process 200 includes loading updates including event list, event attributes for event filtering, state transition table, and instructions in the form of scripts to behavior analyzer module 106 of the virtual machine 104. In accordance with one embodiment, the updates including event list, event attributes for event filtering, state transition table, and instructions in the form of scripts are provided by the behavior analyzer repository 108. In one implementation, this information may be provided to the behavior analyzer module 106 in real-time, i.e., the information provided by the behavior analyzer repository 108 may correspond to the one event of interest currently being processed by the behavior analyzer module 106.

At block 204, the process 200 includes initializing event processing module 106D with specified event list and event attributes for registering events of interest. More specifically, the event processing module 106B is provided with the event parameters of all the events that are operating on the target device 102.

At block 206, the process 200 includes registering and filtering specified event(s). Specified events herein mean the event of interest. The terms specified event(s) and the event of interest are interchangeably usable in the present disclosure. In one embodiment, the step is performed by the event processing module 106-DB of the behavior analyzer module 106.

At block 208, the process 200 includes changing the state of the finite-state machine (or the virtual machine 104) in accordance with a state transition table, wherein each state is related to the event sequence, event attributes, and specific state conditions. In one implementation, the event correlator module 106C performs this step. More specifically, the behavior analyzer repository 108 provides the information associated with the state related to the event sequence, event attributes, and specific state conditions to the event correlator module 106C for facilitating the change of state of the virtual machine 104 to that provided by the behavior analyzer repository 108. As mentioned previously, this state is the expected state of the target device 102 that is simulated on the virtual machine 104. This expected state of the target device 102 simulated on the virtual machine 104 is analyzed and compared against a real-time state of the target device 102.

At block 210, the process 200 includes inquiring if the state identifies a threat. More specifically, the threat handler module 106D is configured for identifying malicious or suspicious behavior on the target device. If the threat handler module 106D determines that an instance of malicious activity has occurred on the target device 102, the threat handler module 106D may further be configured to inform an anti-malware security solutions firmware on the target device 102 of the instance of malicious activity for further action, as depicted at block 212 of the process 200.

If no threat is detected, the process 200 proceeds to block 214, where the process inquires if the script instructions are defined for the current state of the target device 102. If the script instructions are defined, then the process proceeds to block 216 where the script instructions are executed. If the script instructions are not defined, then the process proceeds to block 218, where the next event of interest or the next specified event is taken up for processing by the event correlator module 106C.

Once the script instructions are executed at block 216, the process proceeds to block 220 where the process inquires if a specific state condition check is defined for the current state after the execution of the script instructions at block 216. If such a check for this current state is available at the behavior analyzer repository 108, then the process proceeds to block 222 where the check is performed by the event correlator module 106C, subsequent to which the process is redirected to block 208 and the aforementioned steps are repeated. If no such check is available, the process proceeds to block 218, where the next event of interest or the next specified event is taken up for processing by the event correlator module 106D.

Figure 3:
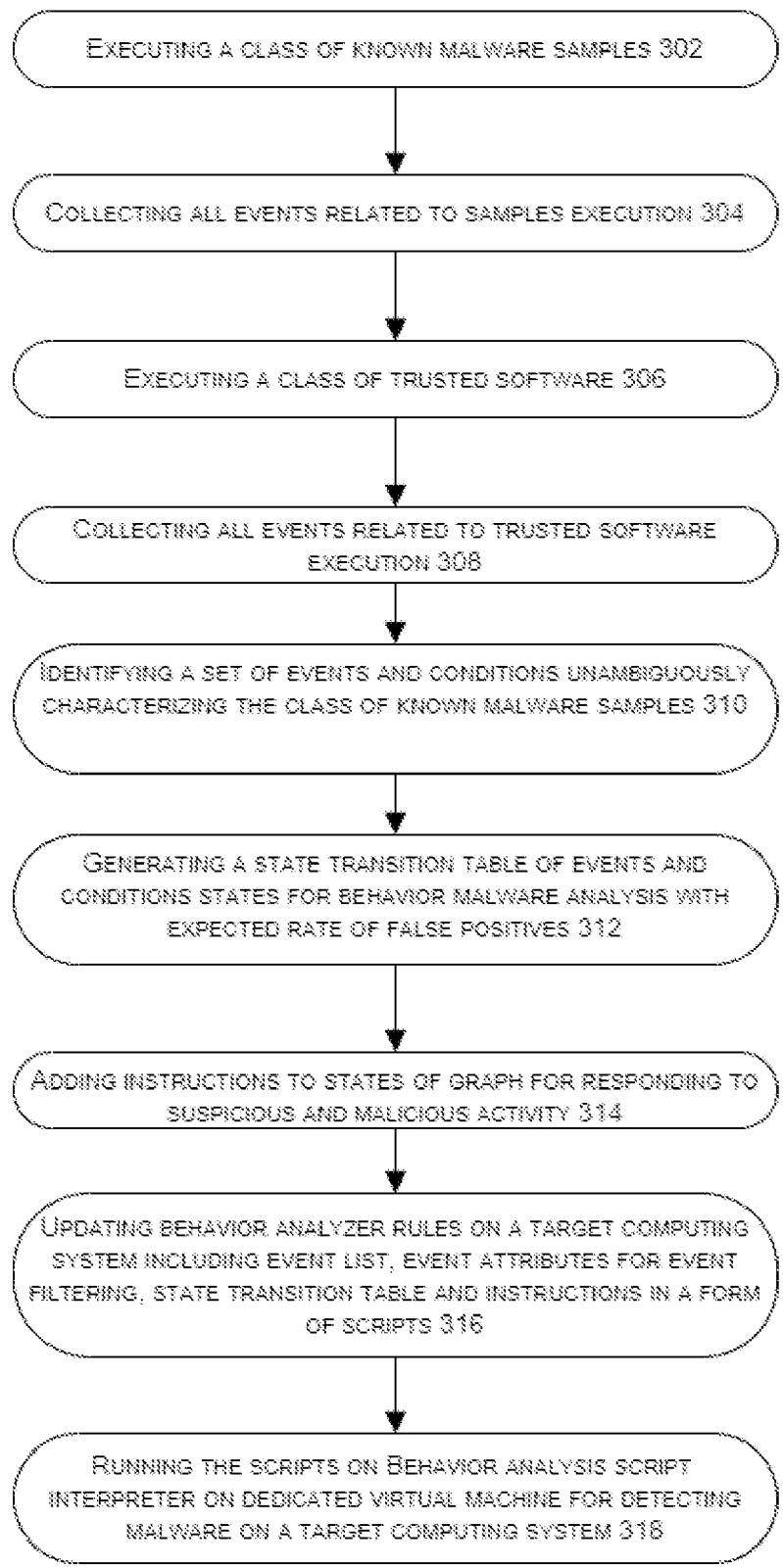
FIG. 3 illustrates a method for preparing a behavior analyzer rules, in accordance with an embodiment of the present disclosure.

FIG. 3 illustrates a method for preparing a behavior analyzer rules. The method is executed on a processor. The method mainly comprises executing a class of known malware samples at block 302. At block 304, the method comprises collecting all events related to samples execution. Further, at block 306, the method comprises executing a class of trusted software. At block 308, the method comprises collecting all events related to trusted software. At block 310, the method comprises identifying a set of events and conditions characterizing the class of known malware samples. At block 312, the method comprises generating a state transition table of events and conditions states for behavior malware analysis with expected rate of false positives. At block 314, the method comprises adding instructions to states of the graph for responding to suspicious and malicious activity. Further at block 316, the method comprises updating behavior analyzer rules on a target computing system including event list, event attributes for event filtering, state transition table and instructions in form of scripts. At block 318, the method comprises running the scripts on behavior analysis script interpreter on a dedicated virtual machine for detecting malware on a target device.

Figure 4:
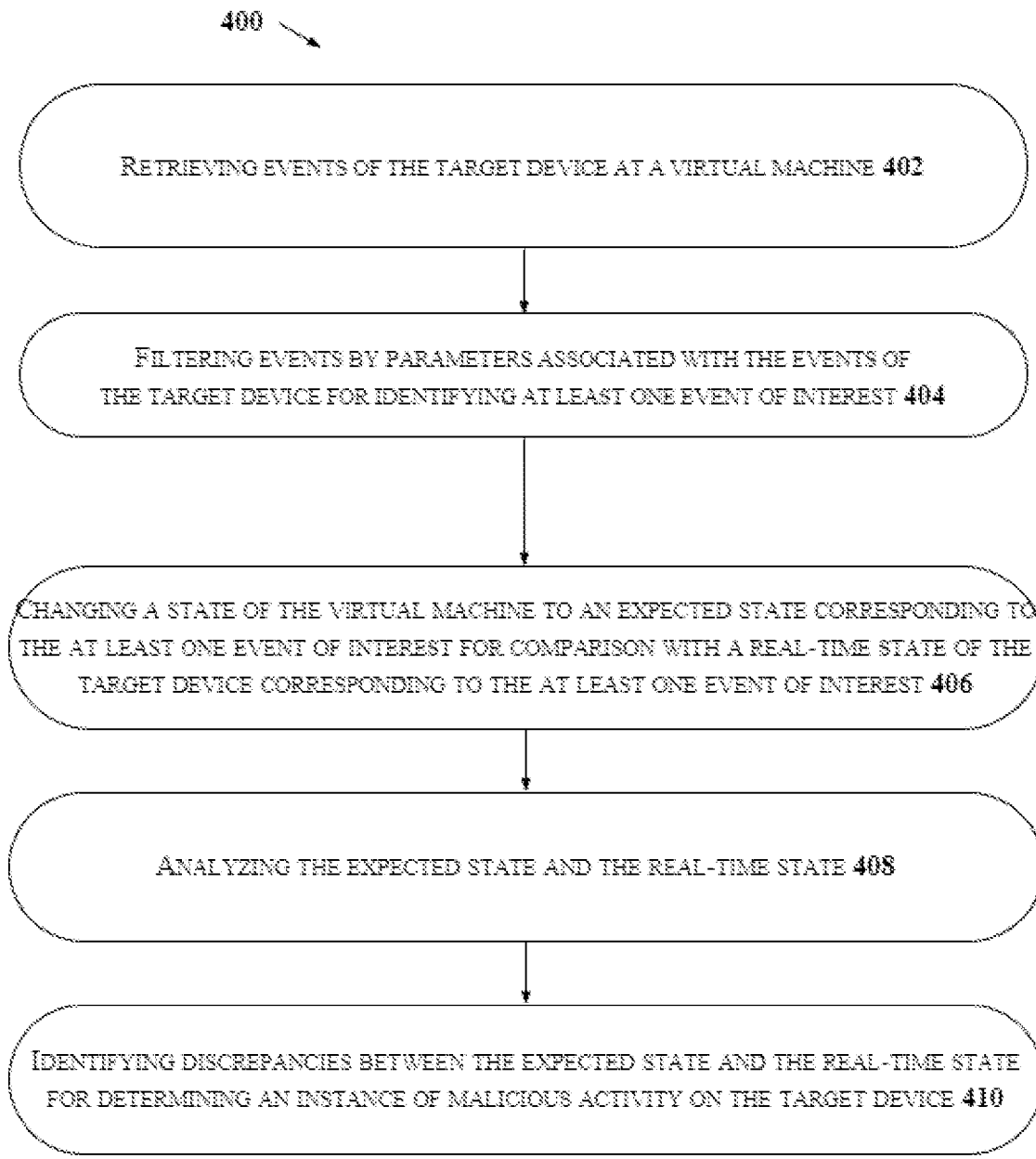
FIG. 4 illustrates a block diagram depicting a method for a system for identifying malicious activity on a target device based on behavior analysis of the target device, in accordance with an embodiment of the present disclosure.

FIG. 4 illustrates a block diagram depicting a method 400 for identifying malicious activity on a target device based on behavior analysis of the target device, in accordance with an embodiment of the present disclosure. It is to be noted that the order in which the method 400 is described is not intended to be construed as a limitation, and any number of the described method blocks can be combined in any order to implement the method or any alternative methods. Additionally, individual blocks may be deleted from the method without departing from the spirit and scope of the subject matter described herein. Furthermore, the method can be implemented in any suitable hardware, software, firmware, or combination thereof.

The method 400, in accordance with one embodiment of the present subject matter, may be implemented by the system 100. At block 402, the method 400 includes retrieving events of the target device 102 at a virtual machine 104. The virtual machine 104 may be communicatively coupled to the target device 102 via the internet. Furthermore, in one implementation, the virtual machine 104 may be provided with remote direct memory access of the target device 102 for extracting system event parameters therefrom without impacting the operating speed and computing resources of the target device 102.

At block 404, method 400 includes filtering the events by parameters associated with the events of the target device 102 for identifying at least one event of interest. In one embodiment, the event of interest is an event that exposes the target device to a chance of a malware attack or malicious activity. The term event of interest is also interchangeably referred to as a specified event in the present disclosure. In one embodiment, this step is performed at the event processing module 106B.

At block 406, the method 400 includes changing a state of the virtual machine to an expected state corresponding to the at least one event of interest for comparison with a real-time state of the target device corresponding to the at least one event of interest. In one embodiment, this step is performed by the event correlator module 106C.

At block 408, method 400 includes analyzing the expected state and the real-time state. In one embodiment, this step is performed by the event correlator module 106C.

At block 410, the method 400 includes identifying discrepancies between the expected state and the real-time state for determining an instance of malicious activity on the target device. In one embodiment, the threat handler module 106D is configured for identifying discrepancies between the expected state and the real-time state for determining an instance of malicious activity on the target device. If the threat handler module 106D determines that an instance of malicious activity has occurred on the target device 102, the threat handler module 106D may further be configured to inform an anti-malware security solutions firmware on the target device 102 of the instance of malicious activity for further action, as depicted at block 212 of the process 200.

Thus, particular implementations of the subject matter have been described. Other implementations are within the scope of the following claims. In some cases, the actions recited in the claims can be performed in a different order and still achieve desirable results. In certain implementations, multitasking and parallel processing may be advantageous.

The invention claimed is:

1. A method for identifying malicious activity on a target device, the method executed on a processor of the target device using an interpreter on the target device for executing a set of script instructions, the method comprising:
   initializing, in a table, a rule structure corresponding to a suspicious activity on the target device, the rule structure comprising:
      a plurality of expressions corresponding to system events, wherein the expressions comprise signatures corresponding to a packet type, a count, or a time period; and
      a plurality of handlers corresponding to the expressions, wherein the handlers are functions executed on the target device when a corresponding expression is true;
   retrieving one or more system events of the target device at an event processing unit before the one or more system events are executed on the target device, wherein the system events characterize system behavior;

filtering the system events at the event processing unit, wherein the event processing unit is configured to convert the system event to a single string with properties of the system event including by selecting only a subset of all event properties of the system event and including the subset in a fixed order in the single string;

processing the single string by changing a state of a finite-state machine to an expected state corresponding to the rule structure in the table including by checking the subset against all of the signatures to determine at least one matching signature, wherein each state is related to an event sequence, one of the subset of event properties, and a specific state condition;

calling one of the plurality of handlers corresponding to the expected state at a threat handler;

taking a remediation action specified by the threat handler and;

wherein the target device comprises a single computing device with an operating system and the interpreter comprises a high-level programming language installed on the single computing device and configured to process a plurality of rule structures in the form of tables, without the set of script instructions being translated into machine code.

2. The method of claim 1, wherein the event processing unit retrieves system events from a system event log, user activity journal, system hook, driver interceptor, or external log.

3. The method of claim 1, wherein initializing the rule structure comprises initializing a plurality of rule structures from a repository of rule structures.

4. The method of claim 3, further comprising updating the repository of rule structures.

5. The method of claim 1, wherein the interpreter is constructed using the Lua programming language.

6. The method according to claim 5, wherein the script instructions are built using the Lua scripting language.

7. The method of claim 1, wherein the behavioral analyzer executes inside a virtual machine executing on the target device.

8. The method of claim 7, further comprising:
providing remote direct memory access to random access memory of the target device where the system events of the target device are stored to the virtual machine,
wherein retrieving the one or more system events does not impact target device operation.

9. The method of claim 1, wherein each event property in the string is separated by a byte, each subsequent byte having a sequential value from a previous byte.

10. The method of claim 1, wherein processing the single string by changing a state of a finite-state machine to an expected state corresponding to the rule structure in the table including by checking the subset against all of the signatures to determine at least one matching signature further comprises matching two signatures, wherein changing the state comprises triggering a first state condition corresponding to a first partial event sequence which is only triggered upon a second state condition corresponding to a second partial event sequence.

11. The method of claim 1, further comprising comparing the expected state to a real-time state of the target device, wherein a difference in the expected state and the real-time state indicates malicious activity.

12. The method of claim 1, wherein the signature comprises a pattern associated with a malicious attack.

13. A system for identifying malicious activity based on behavior analysis, the system comprising:
a target computing device comprising a processor and memory;
a behavioral analysis update repository in communication with the target computing device;
a behavioral analyzer, running on the target computing device, the behavior analyzer comprising an interpreter and further comprising:
  a rule structure, in a table, corresponding to suspicious activity on the target device, the rule structure comprising a plurality of expressions corresponding to system events, wherein the expressions comprise signatures corresponding to a packet type, a count, or a time period and
  a plurality of handlers corresponding to the expressions, and wherein the handlers are functions executed on the target device when a corresponding expression is true;
an event processing module configured for retrieving system events of the target device before the one or more system events are executed on the target device, and for filtering the system events by applying a set of filters to system parameters, wherein the event processing module is configured to convert the system events to a single string with filtered properties of the system event including by selecting only a subset of all event properties of the system event and including the subset in a fixed order in the single string;
an event correlator module configured for processing the single string by transiting a state of the finite-state machine to an expected state corresponding to the rule structure including by checking the subset against all of the signatures to determine at least one matching signature, wherein each state is related to an event sequence, one of the subset of event properties, and a specific state condition, wherein the event correlator module processes a sequence of single string corresponding to events of interest and detects a malicious activity upon transition to a state predefined as a threat;
a threat handler configured for executing handlers corresponding to the expected state;
wherein the target device comprises a single computing device with an operating system and the behavior analyzer is implemented with a scripting language installed on the single computing device and configured to interact directly with the operating system, without the behavior analyzer being translated into machine code.

14. The system of claim 13, further comprising a behavior analyzer repository communicatively coupled to the interpreter, wherein the behavior analyzer repository comprises a plurality of rule structures associated with expected finite states corresponding to a plurality of system events.

15. The system of claim 13, wherein at least one of the handlers corresponding to the expected state causes the threat handler to print a message to a target device console.

16. The system of claim 13, further comprising a virtual machine executing on the target device, wherein the behavioral analyzer executes inside the virtual machine.

17. The system of claim 16, wherein the virtual machine is provided remote direct memory access to random access memory of the target device where the system events of the target device are stored, and wherein the behavior analyzer is further configured to non-invasively retrieve the one or more system events without changing target device operation.

18. The system of claim 13, wherein each event property in the string is separated by a byte, each subsequent byte having a sequential value from a previous byte.

19. The system of claim 13, wherein processing the single string by changing a state of a finite-state machine to an expected state corresponding to the rule structure in the table including by checking the subset against all of the signatures to determine at least one matching signature further comprises matching two signatures, wherein changing the state comprises triggering a first state condition corresponding to a first partial event sequence which is only triggered upon a second state condition corresponding to a second partial event sequence.

20. The system of claim 13, wherein the threat handler is further configured to compare the expected state to a real-time state of the target device, wherein a difference in the expected state and the real-time state indicates malicious activity.

\* \* \* \* \*